US006947734B1

(12) United States Patent
Toubassi

(10) Patent No.: US 6,947,734 B1
(45) Date of Patent: Sep. 20, 2005

(54) METHOD AND SYSTEM FOR LOCATION ACCURACY ANALYSIS

(75) Inventor: Wade H. Toubassi, Overland, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 291 days.

(21) Appl. No.: 10/313,719

(22) Filed: Dec. 6, 2002

(51) Int. Cl.$^7$ .............................. G01S 1/24; G01S 3/02
(52) U.S. Cl. ................ 455/423; 455/404.2; 455/456.1; 455/456.6; 342/420; 342/457; 342/462
(58) Field of Search ................................ 455/423, 424, 455/456.1, 456.5, 9, 67.11, 67.14; 342/419, 342/420, 430, 437, 445, 451, 457, 462–463

(56) References Cited

U.S. PATENT DOCUMENTS

| | | |
|---|---|---|
| 5,293,642 A | 3/1994 | Lo |
| 5,373,298 A | 12/1994 | Karouby |
| 5,481,588 A | 1/1996 | Rickli et al. |
| 5,724,660 A | 3/1998 | Kauser et al. |
| 5,945,948 A * | 8/1999 | Buford et al. .............. 342/457 |
| 5,999,126 A | 12/1999 | Ito |
| 6,002,936 A | 12/1999 | Roel-Ng |
| 6,078,818 A | 6/2000 | Kingdon et al. |
| 6,112,095 A | 8/2000 | Wax et al. |
| 6,166,685 A | 12/2000 | Soliman |
| 6,249,252 B1 | 6/2001 | Dupray |
| 6,263,208 B1 | 7/2001 | Chang et al. |
| 6,266,014 B1 | 7/2001 | Fattouche et al. |
| 6,321,092 B1 | 11/2001 | Fitch et al. |
| 6,473,038 B2 | 10/2002 | Patwari et al. |
| 2004/0072577 A1 * | 4/2004 | Myllymaki et al. ...... 455/456.1 |

FOREIGN PATENT DOCUMENTS

| | | |
|---|---|---|
| EP | 1 045 602 A2 | 10/2000 |
| EP | 1136838 A2 | 9/2001 |
| WO | WO 02/054813 A1 | 7/2002 |

OTHER PUBLICATIONS

Dennis Milbert, "*GPS Accuracy Monitor (Garmin 12XL)*", 10 pgs, May 31, 2001.
David L. Wilson, "*Modeling of GPS Position*", 11 pgs, 2001.
Mario Proietti, "*Testing and Verifying Performance of Location Systems*", 2 pgs, Jun. 13, 2000.
Federal Communications Commission—Wireless Telecommunications Bureau, "*Fact Sheet: FCC Wireless 911 Requirements*", Jan. 2001.
Mark Birchler, "*E911 Phase 2 Accuracy Definition Modification Proposal: Mean Radial Error (MRE)*", Jun. 28, 1999.
Federal Communications Commission, OET Bulletin No. 71, "*Guidelines for Testing and Verifying the Accuracy of Wireless E911 Location Systems*", 12 pgs, Apr. 12, 2000.
Karl V. Bury, "*Statistical Models in Applied Science*", pp. 243-267, 416-439, 1975.
Murray R. Speigel, "*Schaum's Outline of Theory and Problems of Statistics, Third Edition*", pp. 244-245, 523-524, 1998.

* cited by examiner

Primary Examiner—Binh K. Tieu

(57) ABSTRACT

A wireless telecommunications network uses a wireless location technology to determine the locations of mobile stations. As part of a location accuracy analysis process, the wireless location technology is used to obtain a measured latitude and longitude for a mobile station located at a test site having a known latitude and longitude. A data analysis system calculates the radial location error, expressed as a distance, between the measured and known latitude and longitude values. The process is repeated a number of times sufficient to calculate the mean radial location error to within a predetermined uncertainty at a predetermined confidence level.

20 Claims, 2 Drawing Sheets

METHOD AND SYSTEM FOR LOCATION ACCURACY ANALYSIS

BACKGROUND

1. Field of the Invention

The present invention relates to telecommunications and, more particularly, to methods and systems for analyzing the accuracy of a wireless location technology used in a wireless telecommunications network.

2. Description of Related Art

The Federal Communications Commission (FCC) has adopted rules to implement enhanced 911 (E911) services for wireless calls. In Phase I of the E911 requirements, wireless carriers are required to provide the Public Safety Answering Point (PSAP) with the telephone number of the originator of a 911 wireless call and the cell site or base station serving the call originator. In Phase II of the E911 requirements, wireless carriers are also required to provide the PSAP with an Automatic Location Identification (ALI) of the 911 wireless call originator. For handset-based wireless location technologies, the FCC standards require the ALI to have a location accuracy of 50 meters for 67 percent of the calls and 150 meters for 95 percent of the calls.

The FCC has provided non-mandatory guidelines and suggestions for determining whether wireless location systems comply with the FCC's accuracy standards in its "Guidelines for Testing and Verifying the Accuracy of Wireless E911 Locations Systems," OET Bulletin No. 71 (Apr. 12, 2000). The FCC's Guidelines suggest an empirical approach for verifying compliance with its accuracy standards. Specifically, the FCC's Guidelines suggest performing tests at various sample locations to determine the distance between the actual location and the location reported by the ALI system. The FCC's Guidelines also provide a table indicating, for various sample sizes, how many location measurements need to have location errors less than 50 meters and how many need to have location errors less than 150 meters in order to demonstrate compliance at the 90% confidence level.

The statistical approach given in the FCC's Guidelines has several drawbacks. First, it is rather cumbersome. Second, the approach does not provide a measure of how accurate the wireless location system is. The latter point is significant in that wireless location services are of interest not only because of the FCC's mandates but also because other entities may be interested in obtaining location information, e.g., to provide location-based services to wireless customers. Thus, there is a need to efficiently analyze the accuracy of wireless location technologies with regard to the requirements of potential consumers of location information, as well as for compliance with FCC's E911 requirements.

SUMMARY

In a first principal aspect, an exemplary embodiment of the present invention provides a method of analyzing the accuracy of a wireless location technology used in a wireless telecommunications network. In accordance with the method, a test site that has a known location is selected. A wireless location technology is used to determine a measured location for at least one mobile station located at the test site. A location error between the measured location and the known location is calculated. The measurement and calculation steps are repeated for the at least one mobile station to obtain n measured locations and n calculated location errors. An average location error is calculated from the n calculated location errors, wherein n is sufficient to calculate the average location error to within a predetermined uncertainty at a predetermined confidence level. The average location error for that test site is stored in at least one network element of the wireless telecommunications network.

In a second principal aspect, an exemplary embodiment of the present invention provides a system for analyzing the accuracy of a wireless location technology used in a wireless telecommunications network. The system comprises a position determining entity (PDE) and a data analysis system communicatively coupled to the PDE. The PDE provides a plurality of location measurements made by the wireless location technology for at least one mobile station located at a test site having a known location. The data analysis system calculates an average location error from the plurality of location measurements and the known location of the test site.

DETAILED DESCRIPTION OF EXEMPLARY EMBODIMENTS

The present invention, in exemplary embodiments, uses an average location error, such as a mean radial location error, calculated for a given test site to characterize the accuracy of a wireless location technology. The average location error may be determined to within a desired uncertainty at a desired confidence level in accordance with the exemplary methods described below. The average location errors may be reported to emergency services networks and/or other consumers of location information. Moreover, the implementation of the wireless location technology may be adjusted in order to minimize the average location errors.

1. Exemplary Architecture

The wireless location technology is used in a wireless telecommunications network that provides wireless communications to mobile station located in wireless coverage areas served by the network. The wireless location technology may be mobile-based, network-based, or it may use a combination of mobile station and network resources to determine location. For example, the wireless location technology may use the Global Positioning System (GPS) and may be network-assisted. In the network-assisted approach, the mobile station includes a GPS receiver but also communicates with the network to determine its position. A position determining entity (PDE) in the wireless telecommunications network may then calculate the mobile station's location in terms of geographic coordinates, such as latitude and longitude. As described in more detail below, a data analysis system, which may include a computer, may receive the measured locations from the PDE and calculate the location errors.

Figure 1:
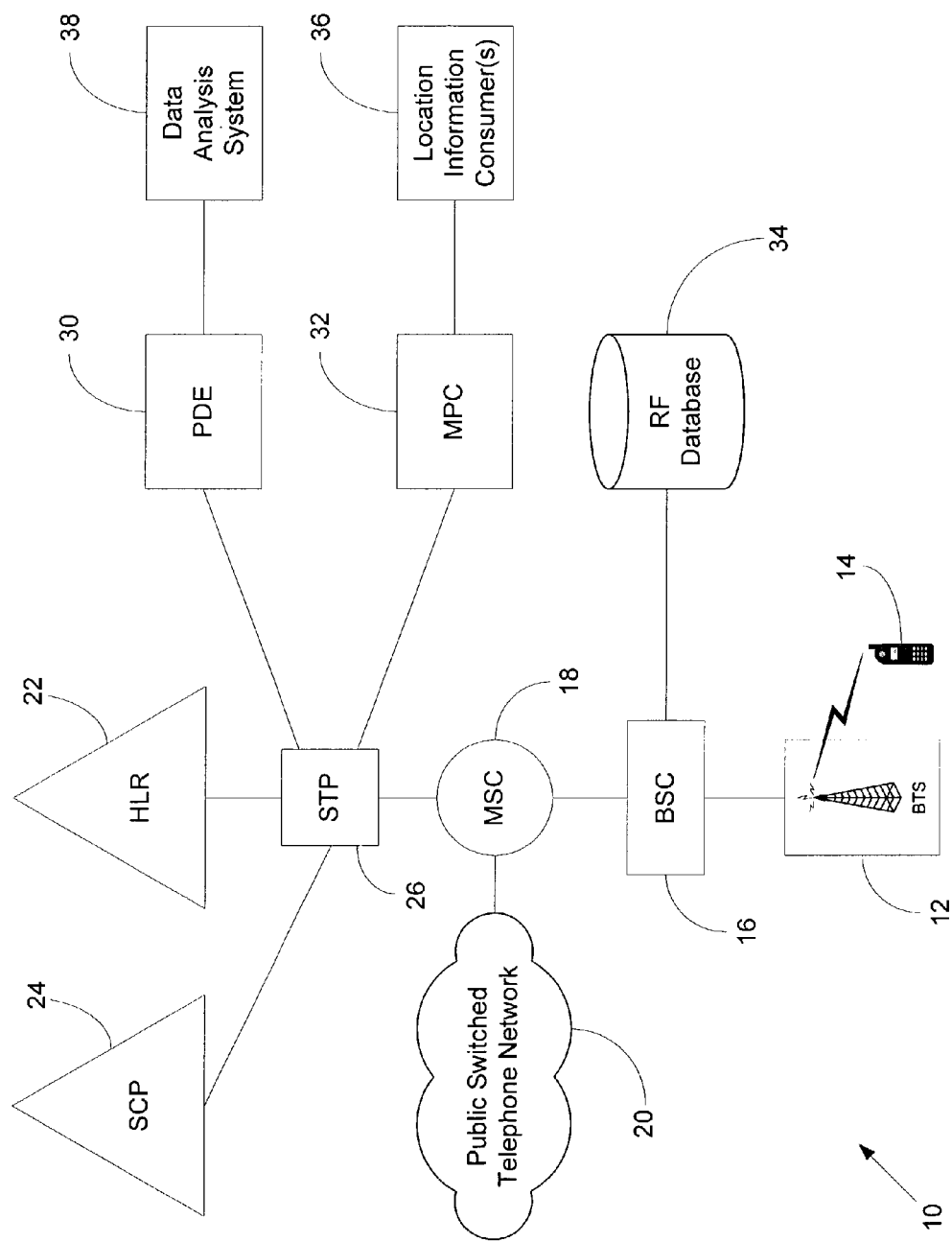
FIG. 1 is a simplified block diagram of a wireless telecommunications network, in accordance with an exemplary embodiment of the present invention.

Referring to the drawings, FIG. 1 is a simplified block diagram of an exemplary wireless telecommunications network 10 in which exemplary embodiments of the present invention may be employed. Wireless telecommunications network 10 includes a base transceiver station (BTS) 12 that provides a wireless coverage area within which BTS 12 may communicate with one or more mobile stations, such as mobile station 14, over an air interface. Mobile station 14 may be a wireless telephone, a wirelessly-equipped personal digital assistant (PDA), or other wireless communication device. The communications between BTS 12 and mobile station 14 may occur in a digital format, such as CDMA, TDMA, GSM, and/or 802.1 x, and/or an analog format, such as AMPS.

BTS 12 may be controlled by a base station controller (BSC) 16, which, in turn, may be controlled by a mobile switching center (MSC) 18. MSC 18 may be connected to a network, such as the public switched telephone network (PSTN) 20. and may use an out-of-band signaling system, such as Signaling System 7 (SS7) to route calls through PSTN 20. MSC 18 is also able to signal to a home location register (HLR) 22 and to a service control point (SCP) 24. This signaling may occur via one or more signal transfer points (STPs), such as STP 26. The signaling between MSC 18 and HLR 22 may conform to IS-41 specifications. A recent revision incorporated herein by reference. The signaling between MSC 18 and SCP 24 may conform to the specification "Wireless Intelligent Network," TIA/EIA/IS-771, published in July 1999, which is incorporated herein by reference. Other signaling protocols could be used, however. In this way, MSC 18, BSC 16, and BTS 12 may connect incoming calls from PSTN 20, which calls may originate from calling parties using landline telephones, mobile stations, or other communication devices, to mobile station 14. Similarly, MSC 18, BSC 16, and BTS 12 may connect calls originating from mobile station 14 to their destinations, via PSTN 20.

Wireless telecommunications network 10 uses a wireless location technology to obtain the location of mobile stations, such as mobile station 14. The specific manner in which network 10 obtains the locations of mobile stations, and the specific network elements that network 10 uses for location determination, will, in general, depend on the wireless location technology that is used. In an exemplary embodiment, network 10 may use a position determining entity (PDE) 30 and a mobile position center (MPC) 32 in connection with location determinations. For example, PDE 30 may determine the location (such as in terms of latitude and longitude) of a mobile station, such as mobile station 14, based at least in part on information provided by mobile station 14 during a location determination session. MPC 32 may store the locations determined by PDE 30. MPC 32 may also control aspects of how network 10 obtains, uses, and provides location information. PDE 30 and MPC 32 may communicate with other elements of network 10 via STP 26, a packet-switched network, and/or some other type of communication link.

In an exemplary embodiment, wireless assisted GPS is used to determine the location of mobile station 14. In the wireless assisted GPS approach, mobile station 14 includes a Global Positioning System (GPS) receiver but does not determine its location on its own. Instead, PDE 30, determines the location of mobile station 14 in terms of latitude and longitude, based at least in part on information provided by mobile station 14. For example, mobile station 14 may first send an indication of its approximate location, such as the cell, sector, or other wireless coverage area it is operating in, to PDE 30. Using this approximate location, PDE 30 determines what GPS satellites are in view and their Doppler offsets and then sends this information to mobile station 14 as "assistance data." Mobile station 14 then uses this assistance data to acquire GPS signals from the GPS satellites and, thereby, obtains information, such as pseudoranges, from which its location may be calculated. Mobile station 14 sends the pseudoranges and/or other location-related information to PDE 30. PDE 30 then calculates the location of mobile station 14, in terms of latitude and longitude, based on the information from mobile station 14 and, optionally, various corrections.

Network 10 may, however, use other wireless location technologies for determining the location of mobile stations, such as mobile station 14. For example, mobile station 14 may use its GPS receiver to determine its location without network assistance. In that case, mobile station 14 may simply send to PDE 30 or other network element its calculated location, e.g., its latitude and longitude, during the location determination session.

Alternatively, network 10 may use wireless location technologies that do not rely on GPS. For example network 10 may use Advanced Forward Link Triangulation (AFLT) to locate mobile stations. In the AFLT approach, a mobile station's location is determined (such as by PDE 30) from the round-trip delays associated with signals between the mobile station and multiple BTSs. In some cases, network 10 may be able to use more than one type of wireless location technology to determine mobile station location. For example, in some or all of the areas served by network 10, network 10 may have the ability to use wireless assisted GPS, AFLT, or both to determine mobile station locations.

The communications between mobile station 14 and wireless telecommunications network 10 may conform to the specification "Position Determination Service Standard for Dual-Mode Spread Spectrum Systems," TIA/EIA/IS-801, dated Oct. 15, 1999, which is incorporated herein by reference. Other protocols may be used, however.

Network 10 may also include one or more databases that store parameters specifying aspects of how to carry out location determinations. Such parameters may specify, for example, the power levels, forward link and reverse link calibrations, sector center latitude and longitudes, maximum antenna ranges, antenna latitude and longitudes, and orientation accuracies to use in location determinations. In this regard, FIG. 1 shows RF database 34 as representative of such databases in network 10. RF database 34 may be communicatively coupled to BSC 16, as shown in FIG. 1. Alternatively, RF database 34 may be a part of BSC 16, or RF database 34 may be a part of, or accessible by, other network elements, such as PDE 30 and/or MPC 32.

Wireless telecommunications network 10 may also make the locations stored in MPC 32 available to one or more location information consumers 36. Such location information consumers may include providers of emergency services. For example, MPC 32 may report the location of a mobile station engaged in an E911 call to a PSAP or other element of an emergency services network. Location information consumers 36 could also include other entities, which may be commercial or non-commercial, that make use of location information. Such location information consumers may, for example, monitor the locations of mobile stations and/or provide location-based services to mobile stations or to others.

Network 10 may also include a data analysis system 38 for location accuracy analysis. Data analysis system 38 may obtain the mobile stations locations determined by PDE 30, compare the locations to "ground truth," and calculate the location errors, as described in more detail below. Data analysis system 38 may include a computer that is programmed to perform these calculations automatically. Thus, data analysis system 38 may include one or more processors, data storage, and programming in the form of machine language instructions stored in the data storage. Data analysis system 38 may be a separate network element of network 10. Alternatively, data analysis system 38 may be integrated with a network element, such as PDE 30.

2. Exemplary Operation

To analyze the accuracy of the wireless location technology, a plurality of test sites may be chosen in areas served by the wireless telecommunications network. The test sites may be located in the same or in different cells or sectors. Preferably, the test sites correspond to likely spots where mobile stations may originate calls that trigger E911 or other location-based services. The locations of the test sites are determined to a high degree of accuracy, i.e., their "ground truth" locations are determined, such as by using surveys. In this regard, surveys are often able to determine locations to within 1 cm. The "ground truth" locations, which may be expressed in terms of latitude and longitude, may be stored in data analysis system 38.

One or more mobile stations are then located at the test sites, and the wireless location technology is used to measure the locations of the mobile station(s). Data analysis system 38 receives the measured locations, e.g., from PDE 30, and calculates the location error for each measurement. As described in more detail below, the location errors may be radial location errors, i.e., expressed as radial distances from the "ground truth" locations of the test sites. Data analysis system 38 may also obtain other information from PDE 30 or other elements of network 10, such as the mobile identification numbers (MINs) or other identifiers of the mobile station(s) or types of mobile station(s) used in the testing.

Data analysis system 38 may calculate the radial location error as follows. First, the differences between the measured and "ground truth" latitudes and longitudes are calculated as set forth below:

$$\Delta_{long} = A_{test} - A_{truth}$$

$$\Delta_{lat} = B_{test} - B_{truth}$$

In this expression, $A_{test}$ and $A_{truth}$ are the measured and "ground truth" longitude values, respectively, and $B_{test}$ and $B_{truth}$ are the measured and "ground truth" latitude values, respectively. The location errors in "x" and "y" directions, expressed as distances, may then be calculated as follows:

$$\Delta x = K_{long} \Delta_{long}$$

$$\Delta y = K_{lat} \Delta_{lat}$$

In this expression, $K_{long}$ and $K_{lat}$ are correction factors to convert longitude and latitude differences, respectively, to distances. If the latitudes are expressed in degrees and the location errors are to be expressed in meters, then $K_{lat} = 1852 \times 60$ may be used, based on the conversion factor that one minute of arc is nominally equal to 1852 meters. Alternatively, a correction factor that varies with latitude may be used in order to take into account the earth's deviation from a perfect sphere. The corresponding correction factor for longitude may take into account the fact that the distance between longitudinal lines varies with latitude, even for a perfect sphere. Thus, $K_{long} = 1852 \times 60 \times \cos(A_{test})$ may be used. Data analysis system 38 may calculate the radial location error, r, for a given measurement as follows:

$$r = \sqrt{(\Delta x)^2 + (\Delta y)^2}$$

Data analysis system 38 obtains a total of n location measurements for a given test site. The n location measurements may all be of the same mobile station. Alternatively, the n location measurements may be of several different mobile stations at the test site. Data analysis system 38 may calculate n radial location errors, $r_l$, from the n location measurements, in the manner described above. Data analysis system 38 may also calculate an average radial location error from the n radial location errors. The average radial location error may be a mean radial location error, calculated as follows:

$$\mu_{calc} = (1/n) \Sigma r_l$$

However, other types of averages may be used. For example, data analysis system 38 may calculate a root-mean-square radial location error, as follows:

$$\rho_{calc} = \sqrt{(1/n) \Sigma r_l^2}$$

It is to be understood that the calculated average location errors may themselves be random variables that may differ from the true average location errors. Thus, the calculated mean radial location error, $\mu_{calc}$, may estimate the true value, $\mu$, to within an uncertainty $\delta$ (dependent on the statistical confidence level), as summarized by the following expression:

$$\mu = \mu_{calc} \pm \delta$$

Of course, $\delta$ increases as the desired statistical confidence level increases. In addition, for a given confidence level, $\delta$ decreases as more location measurements are taken, i.e., as n increases.

Thus, the number, n, of location measurements used to calculate $\mu_{calc}$, may be chosen so as to be able to calculate $\mu$ to within a predetermined uncertainty at a predetermined confidence level, such as the 95% confidence level. The number, n, of location measurements required to achieve this level of accuracy may be estimated based on the following model.

In this model, the location errors in both the x and y directions are assumed to be random variables that have a normal, i.e., Gaussian distribution, with an expected value of zero and a standard deviation of $\sigma$. Based on this model, it can be shown that the radial location error, r, is a random variable with a Rayleigh distribution given by the following expression:

$$f(r) = (r/\sigma^2) \exp(-r^2/2\sigma^2)$$

The mean, $\mu$, for this distribution, i.e., the true mean radial location error, is given by the following expression:

$$\mu = \sigma \sqrt{(\pi/2)}$$

Given this relation between $\mu$, the true mean radial location error, and $\sigma$, the standard deviation in the underlying Gaussian distribution of the location errors in the x and y directions, confidence intervals for $\mu$ may be estimated from the confidence intervals for $\sigma$. In particular, at the 95% confidence level, $\sigma$ may be estimated to lie within the following interval:

$$s\sqrt{(n/\chi^2_{975,v})} \leq \sigma \leq s\sqrt{(n/\chi^2_{025,v})}$$

where $X_{975,v}^2$ and $X_{025,v}^2$ are the 97.5 and 2.5 percentile values, respectively, for the chi-square distribution with $v=n-1$ degrees of freedom. The quantity, s, is the standard deviation applicable to the location errors in either the x or y directions. Thus, s may be taken to be $$\sqrt{(1/n)\Sigma(\Delta x_i)^2},$$

with $\Delta x_i$ representing the n measured location errors in the x direction, or s may be taken to be $$\sqrt{(1/n)\Sigma(\Delta y_i)^2},$$

with $\Delta y_i$ representing the n measured location errors in the y direction. Alternatively, since the measured radial location errors are related to the measured location errors in the x and y directions by $r_I^2=(\Delta x_I)^2+(\Delta y_I)^2$, s may be taken to be $$\sqrt{(1/2n)\Sigma r_I^2},$$

with $r_I$ representing the n measured radial location errors. Alternatively, other ways of estimating s could be used.

Thus, given a desired uncertainty, $\delta$, and using the 95% confidence level, the required number of location measurements, n, may be found using the following expression:

$$s\sqrt{(n/\chi^2_{025,v})} - s\sqrt{(n/\chi^2_{975,v})} \leq 2\delta\sqrt{(\pi/2)}$$

However, for sufficiently large n:

$$\chi^2_{975} \approx (1/2)(\sqrt{2n}+1.96)^2 \text{ and } \chi^2_{025} \approx (1/2)(\sqrt{2n}-1.96)^2$$

Using these approximations, the above expression to find n may be simplified to the following:

$$n \geq (\pi/2)[(1.96/\sqrt{2})(s/\delta)]^2 \approx 3(s/\delta)^2$$

Thus, n may be chosen to achieve a particular level of uncertainty expressed as a distance, i.e., $\delta$. Alternatively, n may be chosen to achieve a particular level of uncertainty expressed as a ratio, e.g., s/$\delta$. Other ratios could be used, however, and the level of uncertainty could be characterized in other ways. Moreover, other ways of estimating n could be used. Finally, other statistical models, such as models that do not rely on assuming Gaussian or Rayleigh distributions, could be used.

In this way, data analysis system 38 may calculate the average location errors (e.g., the mean radial location errors) at a plurality of test sites to within a predetermined uncertainty (whether characterized as a distance, as a ratio, or in some other manner) at a predetermined confidence level, such as the 95% confidence level. Data analysis system 38 may also store the calculated average location errors for each test site in its own data storage and/or in one or more network elements, such as PDE 30, MPC 32, and/or RF database 34. Moreover, data analysis system 38 may store each average location error in a data record that includes other information, such as the location of the test site, the type of mobile station(s) used for the location measurements, and/or other information. In this way, wireless telecommunications network 10 may maintain information that characterizes how accurate location determinations typically are for different areas served by network 10.

Figure 2:
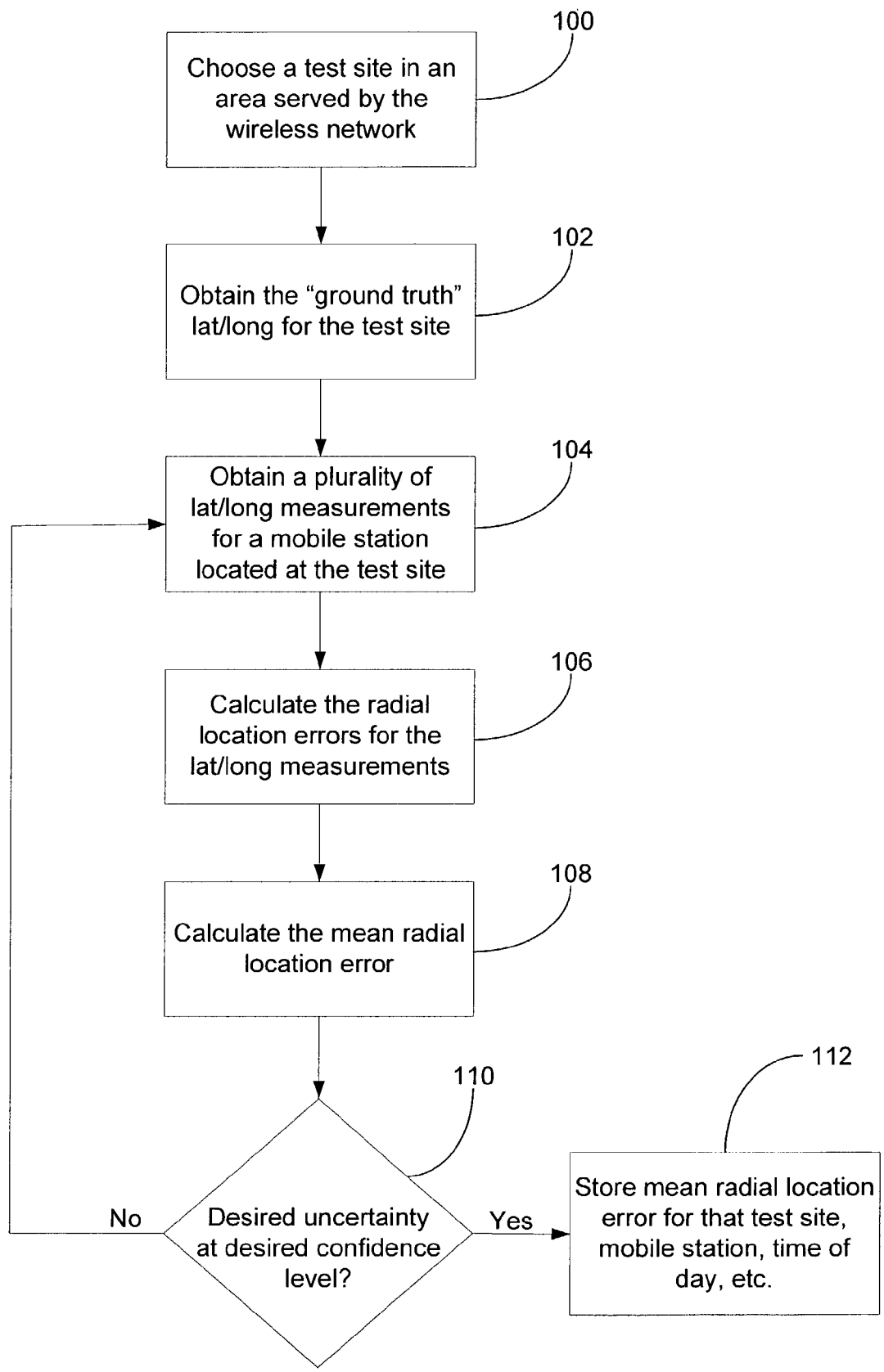
FIG. 2 is a flow chart of a location accuracy analysis process, in accordance with an exemplary embodiment of the present invention.

FIG. 2 is a flow chart illustrating, in simplified form, an exemplary location accuracy analysis process. The process may begin by choosing a test site in an area served by wireless telecommunications network 10, as indicated by step 100. For example, the test site could be located in the wireless coverage area of BTS 12. As indicated by step 102, the "ground truth" latitude and longitude is then obtained for the test site, such as by using surveys. Data analysis system 38 may store the "ground truth" latitude and longitude. Network 10 uses a wireless location technology to obtain a plurality of latitude and longitude measurements for a mobile station, such as mobile station 14, located at the test site, as indicated by step 104. As indicated by step 106, the radial location errors are then calculated, such as by data analysis system 38, based on the latitude and longitude measurements from step 104 and from the "ground truth" latitude and longitude. The radial location errors may be expressed as distances, as described above. The mean radial location error is then calculated, such as by data analysis system 38, as indicated by step 108.

Data analysis system 38 may then determine whether the uncertainty, at the 95% or other desired confidence level, in the calculated mean radial location error is at or below the desired level of uncertainty, as indicated by step 110. If the desired level of uncertainty at the desired confidence level has been achieved, then data analysis system 38 may store a data record that indicates the mean radial location error. The data record may include other information as well, such as the location of the test site used to determine the mean radial location error, an identification of the mobile station (s), such as by mobile identification numbers (MINs), or the type of mobile station(s) used for the location measurements, an identification of the wireless location technology location technology or parameters of the wireless location technology used for the location measurements, the dates and times of the location measurements, and/or other circumstances of the location measurements. If, on the other hand, the desired uncertainty at the desired confidence level has not been achieved, then network 10 may use the wireless location technology to obtain additional latitude and longitude measurements for the mobile station located at the test site.

The average location errors (e.g., mean radial location errors) stored in network 10, as described above, may be used in various ways. For example, network 10 may report average location errors to providers of emergency services. When a mobile station, such as mobile station 14, makes an E911 call, network 14 uses a wireless location technology to determine the location of mobile station 14. Network 10 may also retrieve the average location error for that wireless location technology that was previously determined for a nearby test site, e.g., a test site in the same cell or sector as mobile station 14. Then, when network 10 reports the location of mobile station 14 to the emergency services network, network 10 may also report the average location error. In this way, the PSAP or other emergency service provider, may be made aware of how accurate the reported location is likely to be. Network 10 may similarly report average location errors when it reports mobile station locations to other location information consumers.

The average location errors may also be used to increase the accuracy of the wireless location technology used in network 10. In particular, the wireless location technology may have some flexibility in how it is used by network 10. For example, RF database 34 may store one or more adjustable parameters specifying how to make location determinations for a given wireless coverage area, e.g., a cell or sector. Thus, the wireless location technology in network 10 may be "tuned," by adjusting one or more of these adjustable parameters, in order to minimize the average location errors calculated for one or more test sites in that wireless coverage area.

In addition, whenever a mobile station's location is to be determined, network 10 may choose, in real time, the wireless location parameters that result in the smallest radial location error for that type of mobile station in that location at that time of day, based on the mean radial location errors stored by network 10. Similarly, if network 10 is able to use different types of wireless location technologies, such as wireless assisted GPS and AFLT, then network 10 may choose the wireless location technology with the lowest average location error to locate a mobile station in a given wireless coverage area.

Wireless telecommunications network 10 may also use the average location errors in other ways. For example, network 10 may do position averaging of a mobile station, based on the mobile station's rate of mobility and the average location error.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of analyzing the accuracy of a wireless location technology used in a wireless telecommunications network, said method comprising:
   (a) selecting a test site, said test site having a known location;
   (b) using said wireless location technology to determine a measured location for at least one mobile station located at said test site;
   (c) calculating a location error between said measured location and said known location;
   (d) repeating steps (b) and (c) for said at least one mobile station located at said test site to obtain n measured locations and n calculated location errors;
   (e) calculating an average location error for said test site from said n calculated location errors, wherein n is sufficient to calculate said average location error to within a predetermined uncertainty at a predetermined confidence level; and
   (f) storing said average location error for said test site in at least one network element of said wireless telecommunications network.

2. The method of claim 1, wherein said average location error is a mean location error.

3. The method of claim 2, wherein said n location errors are radial location errors and said mean location error is a mean radial location error.

4. The method of claim 1 further comprising:
   adjusting how said wireless location technology is used so as to reduce said average location error for said test site.

5. The method of claim 1, wherein said at least one network element includes a position determining entity (PDE).

6. The method of claim 5, wherein a data analysis system performs at least steps (c) and (e).

7. The method of claim 6, wherein said data analysis system obtains said n measured locations from said PDE.

8. The method of claim 7, wherein said data analysis system obtains from said PDE said n measured locations expressed as geographic coordinates.

9. The method of claim 8, wherein said data analysis system obtains from said PDE said n measured locations expressed as latitude and longitude.

10. The method of claim 9, wherein said data analysis system calculates said n calculated location errors and said mean location error as distances.

11. The method of claim 1, further comprising:
    performing steps (a) through (f) for a plurality of test sites with known locations, to obtain a plurality of average location errors stored in said at least one network element.

12. The method of claim 11, further comprising:
    using said wireless location technology to determine a measured location of a mobile station located at an initially unknown location;
    reporting said measured location of said mobile station to a location information consumer; and
    reporting a relevant one of said stored plurality of average location errors to said location information consumer.

13. The method of claim 12, further comprising:
    determining a wireless coverage area corresponding to said measured location of said mobile station; and
    identifying one of said plurality of test sites as being located in said wireless coverage area, wherein said relevant average location error was obtained for said one of said plurality of test sites.

14. A system for analyzing the accuracy of a wireless location technology used in a wireless telecommunications network, said system comprising:
    a position determining entity (PDE), said PDE providing a plurality of location measurements made by said wireless location technology of at least one mobile station located at a test site, said test site having a known location; and
    a data analysis system communicatively coupled to said PDE, said data analysis system calculating an average location error for said test site from said plurality of location measurements and said known location of said test site.

15. The system of claim 14, wherein said average location error is a mean location error.

16. The system of claim 14, wherein said mean average location error is an average radial location error.

17. The system of claim 16, wherein said data analysis system calculates said average radial location error to within a predetermined uncertainty at a predetermined confidence level.

18. The system of claim 14, wherein said PDE provides said plurality of location measurements expressed as geographic coordinates.

19. The system of claim 18, wherein said PDE provides said plurality of location measurements expressed as latitude and longitude.

20. The system of claim 19, wherein said data analysis system calculates said average location error as a distance.

* * * * *